United States Patent [19]

Christian et al.

[11] Patent Number: 5,496,027
[45] Date of Patent: Mar. 5, 1996

[54] REINFORCED HOCKEY STICK BLADE AND METHOD OF MAKING SAME

[75] Inventors: William D. Christian; Roger A. Christian, both of Warroad, Minn.

[73] Assignee: Christian Brothers, Inc., Warroad, Minn.

[21] Appl. No.: 222,424

[22] Filed: Apr. 1, 1994

[51] Int. Cl.⁶ .................................................. A63B 59/14
[52] U.S. Cl. ........................................................ 273/67 A
[58] Field of Search ........................................... 273/67 A

[56] References Cited

U.S. PATENT DOCUMENTS

| | | |
|---|---|---|
| 664,064 | 12/1900 | Thun et al. . |
| 698,490 | 4/1902 | Groebli . |
| 1,317,146 | 9/1919 | Welles . |
| 2,535,033 | 12/1950 | Bergere . |
| 2,912,245 | 11/1959 | Gardner et al. . |
| 3,025,062 | 3/1962 | Duffin . |
| 3,129,003 | 4/1964 | Mueller et al. . |
| 3,184,236 | 5/1965 | Zens . |
| 3,236,070 | 2/1966 | Clayton, Jr. . |
| 3,353,826 | 11/1967 | Traverse . |
| 3,442,002 | 5/1969 | Geary, Jr. et al. . |
| 3,709,751 | 1/1973 | Carlson et al. . |
| 3,961,790 | 6/1976 | Milligan ..................... 273/67 A |
| 4,086,115 | 4/1978 | Sweet, Jr. et al. ........... 273/67 A |
| 4,134,154 | 1/1979 | Faulkner . |
| 4,148,482 | 4/1979 | Harwell, Jr. et al. ........ 273/67 A |
| 4,591,155 | 5/1986 | Adachi . |
| 4,600,192 | 7/1986 | Adachi ........................ 273/67 A |
| 4,741,087 | 5/1988 | Plummer, Jr. . |
| 4,802,426 | 2/1989 | Hinshaw . |
| 4,860,631 | 8/1989 | Aoshiro . |

FOREIGN PATENT DOCUMENTS

| | | |
|---|---|---|
| 241018 | 2/1960 | Australia . |
| 1138912 | 1/1983 | Canada . |
| 2353843 | 10/1974 | Germany . |

Primary Examiner—Vincent Millin
Attorney, Agent, or Firm—Dorsey & Whitney

[57] ABSTRACT

A reinforced blade for a hockey stick or the like is disclosed. A braided tubular sleeve and appropriate resin material are placed on the replacement blade, including on the connection end at the top of the replacement blade. The braided tubular sleeve and resin are molded in place by a molding device. The connection end is then inserted into the hollow lower end of a handle. The resulting hockey stick is thereby reinforced and resistant to breakage at the point of connection.

18 Claims, 3 Drawing Sheets

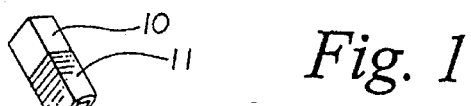
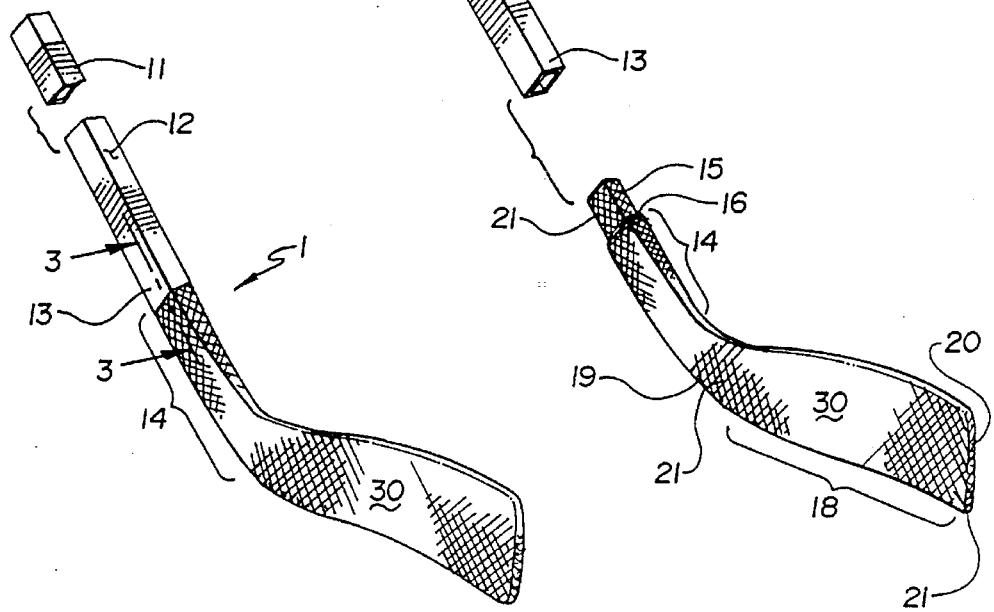
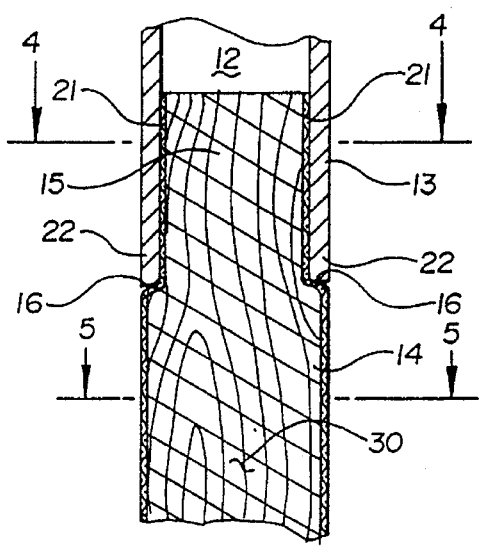
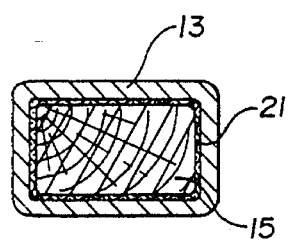
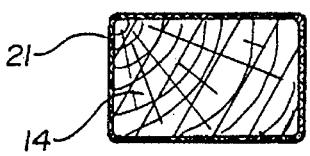

REINFORCED HOCKEY STICK BLADE AND METHOD OF MAKING SAME

BACKGROUND OF THE INVENTION

1. Field of the Invention

The present invention relates generally to the field of hockey sticks and the like, and more particularly to a reinforced replacement blade for an ice hockey stick and method of making the same.

2. Description of Prior Art

Hockey sticks in general, and ice hockey sticks in particular, have experienced dramatic changes throughout the years. As a result, ice hockey sticks have evolved from plain wooden sticks having a straight blade and handle to significantly improved sticks having a curved blade and fiberglass reinforcement.

The construction of the stick has also evolved substantially. Initially, the handle and blade portions were both constructed of wood and were integrally joined with one another through various processes so that the handle and the blade were essentially a single, integral unit. As technology developed, metal handles, particularly aluminum handles, were introduced as a substitute for the traditional wooden handles. These handles include an elongated handle portion constructed of a tubular section of aluminum or other lightweight metal. Handles of this type are used with replacement blades. Plastic or composite handles are also now being used. Like the aluminum handles, they are elongated and generally hollow and are secured to a replacement blade portion in a manner similar to the aluminum handles.

The replacement blade includes a blade portion, a shaft portion, and a connection end. The blade portion includes a toe end and a heel end. The shaft portion begins at the heel and extends upward to the connection end. The connection end is directly above the shaft portion, and it is designed and formed for insertion into the lower end of the handle. The blade and shaft portions of the replaceable blade are usually covered with a reinforcement material to improve the durability of these areas. One reinforcement technique involves the use of a sheet of fiberglass or other reinforcing material which is folded around the blade and shaft portions. Another technique involves the use of a sleeve of braided fiberglass or other reinforcing fibers as shown in Canadian Patent No. 1,138,912 issued in 1983 to Harwell. In both cases, a curable resin is applied to the reinforcement material to bond such material to the replacement blade. After the resin cures, excess reinforcement material is removed by sanding and the shaft end of the replacement blade is cut or routed to form a shoulder and thus the connection end. During this process, the reinforcement material and a portion of wood is removed at the connection end to provide it with the proper configuration and dimensions for insertion into the hollow end of the metal or plastic handle.

Although metal and plastic hockey stick handles have been positively received by hockey players, there is a tendency for the connection end of the accompanying replacement blade to break at or near the point at which it is secured to the lower end of the handle. This tendency to break is due in large measure to the necessary removal of the reinforcement material at the connection end and a narrowing of connection end dimensions to enable its insertion into the handle. The problem is further exacerbated by the continuing popularity of the slapshot and the emergence of bigger and stronger players, both of which result in greater stresses being placed on the hockey stick. Experience has shown that the weak point of the replacement blade is the point at which the blade joins with the lower end of the handle.

This problem has been previously recognized and various attempts have been made to reinforce this point of connection. For example, U.S. Pat. No. 3,934,875, issued to Eastan et al., used a tapered metal shank which mates with a rectangular tubular shaft or handle to form a bond between the handle and blade. In U.S. Pat. No. 4,358,113, issued to McKinnon et al., a double-box beam shaft in which a pair of fiberglass rods are positioned is used to provide reinforcement through the heel and neck portion of the blade. Both of these solutions as well as others are unsatisfactory for one reason or another. For example, both of the above solutions require a plastic or fabricated blade. Thus, they are not applicable for wooden blades. Accordingly, a need continues to exist in the art for a replacement blade usable with an aluminum or plastic hockey stick handle in which the connection point is reinforced to prevent breakage.

SUMMARY OF THE INVENTION

A hockey stick or the like is disclosed. In one embodiment, the invention comprises a replacement blade for a handle having a hollow lower end. The replacement blade includes a blade portion, a shaft portion, a connection end, and a shoulder adjacent to the connection end. The blade portion includes a forwardly disposed toe, and a rearwardly disposed heel. The shaft portion is separated from the shoulder by the connection end. The connection end has an exterior configuration and exterior dimensions approximating the interior configuration and dimensions of the hollow lower end of the handle. Reinforcement material covers at least a portion of this connection end. The connection end is insertable into the hollow lower end of the handle so that the shoulder engages the lower edge of the handle.

A method of reinforcing a blade for a hockey stick or the like is also disclosed. In one embodiment, the method of reinforcing the blade comprises the steps of: cutting the connection end of a replacement blade to dimensions less than the inner dimensions of the handle; placing a reinforcement material onto the connection end; applying a resin to the reinforcement material and forming the connection end and shoulder to desired dimensions. In the preferred method, a molding device is used to mold the connection end including applied reinforcement material to exact desired dimensions for insertion into the hollow handle. The resin is then allowed to cure.

Accordingly, it is an object of the present invention to provide an improved, reinforced hockey stick having a stick handle and a reinforced replacement blade. The replacement blade includes a blade portion, a shaft portion, and a reinforced connection end.

Another object of the present invention is to provide a replacement blade for a hockey stick handle which is reinforced to limit breakage at the point of connection with the handle.

A further object of the present invention is to provide a replacement blade for a hockey stick having a connection end which is reinforced with a braided, tubular reinforcement material.

A still further object of the present invention is to provide a method of making a reinforced replacement blade for a hockey stick in which the method includes providing a layer of reinforcing material at the connection end and forming such material to a desired configuration and dimensions for insertion into the hockey stick handle.

These and other objects of the present invention will become apparent with reference to the description of the drawings, preferred embodiment and method, and the appended claims.

BRIEF DESCRIPTION OF THE DRAWINGS

FIG. 1 is an exploded perspective view of a hockey stick incorporating the reinforced replacement blade of the present invention.

FIG. 2 is a perspective view of a hockey stick similar to FIG. 1 in which the replacement blade has been connected to the hollow handle.

FIG. 3 is a view, partially in section, as viewed along section line 3—3 of FIG. 2.

FIG. 4 is a sectional view as viewed along the section line 4—4 of FIG. 2.

FIG. 5 is a sectional view as viewed along the section line 5—5 of FIG. 2.

DESCRIPTION OF THE PREFERRED EMBODIMENT AND METHOD

Figure 6:
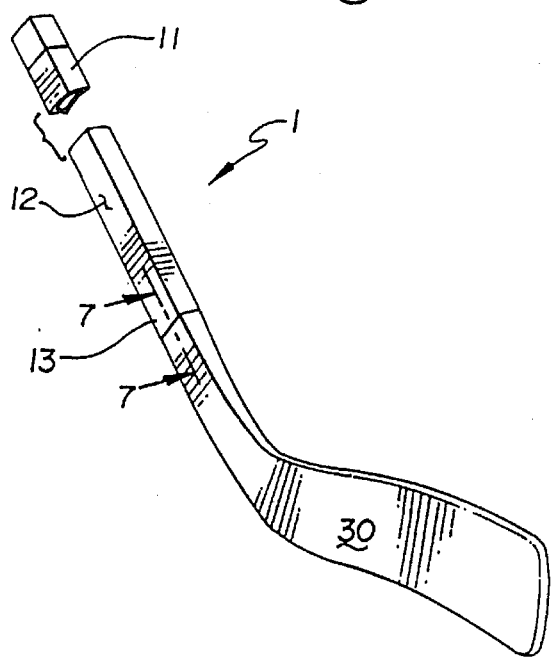
FIG. 6 is a perspective view of an alternate embodiment, similar to FIGS. 1 and 2, in which the replacement blade has been connected to the hollow handle.

The hockey stick with which the present invention has particular applicability is a hockey stick of the type having a separate handle (constructed of aluminum, plastic or the like) and a replacement blade. As illustrated in FIGS. 1, 2, and 6, the stick 1 includes an elongated handle 12 having a lower end 13, and an upper end (or free end) 11. As illustrated best in FIG. 1, the handle 12 is preferably hollow throughout its entire length. In another embodiment, at least a portion of the handle 12 could be filled with a lightweight foam or other material to provide desired flex or stiffness characteristics to the handle. In any event, at least the lower end 13 of the handle 12 is hollow so that the connection end 15 of the replacement blade 30 may be inserted therein.

The replacement blade 30 includes a blade portion 18, a shaft portion 14, and a connection end 15. The blade 30 also preferably includes a shoulder 16 adjacent to the connection end 15. The blade portion 18 includes a forwardly disposed toe 20, and a rearwardly disposed heel 19. The connection end 15 has an exterior configuration and exterior dimensions approximating the interior configuration and dimensions of the hollow lower end 13 of the handle 12.

The upper end 11 of the handle 12 has a plug 10 which may be rubber, wood or any other appropriate material. In the preferred embodiment, it is contemplated that the handle 12 will be constructed of aluminum, an aluminum alloy, a composite material, plastic, or other material suitable for use as a hockey stick. The replacement blade 30 is constructed primarily of wood or wood portions, although it is contemplated that it could be constructed from other appropriate materials (e.g., plastic).

The replacement blade 30 is reinforced by a layer of reinforcing material 21, which in the preferred embodiment is a braided tubular sleeve and a curable resin. The braided tubular sleeve is impregnated with a curable resin material to provide it with reinforcement properties and to bond the sleeve firmly and securely to the replacement blade 30. The use of reinforcement materials such as fiberglass and the like are well known in the art to reinforce hockey stick blades and shafts. However, with the present invention, the reinforcement material 21 also covers the connection end 15 to provide added strength and durability to this critical part of the replacement blade 30.

The detailed structure of the connection end 15 and the manner in which the lower end 13 of the handle 12 is connected with the replacement blade 30 is illustrated best in FIGS. 3, 4, and 5. As shown in FIG. 3, the connection end 15 is the uppermost end of the blade 30 and is separated from the shaft 14 by the shoulder 16. The dimensions and configuration of the connection end 15, after the reinforcement material 21 is applied, approximate the internal dimensions and configuration of the hollow lower end 13, thereby permitting the connection end and reinforced material 21 is to be inserted into the hollow lower end 13. Since the reinforcement material 21 will have some thickness, the dimensions of the connection end 15 prior to application of the reinforcement material will be correspondingly smaller than the internal dimensions of the hollow lower end 13.

In the preferred embodiment, the width of the shoulder 16, which extends around the entire periphery of the stick, approximates the material thickness of the lower end 13 of the handle 12. Thus, when the connection end 15 with the reinforcement layer 21 thereon is inserted into the lower end 13 as shown in FIG. 3, the lower edge 22 of the lower end 13 seats against the shoulder 16 and the outer surface of the lower end 13 is flush with the outer surface of the upper end of the shaft 14.

Figure 7:
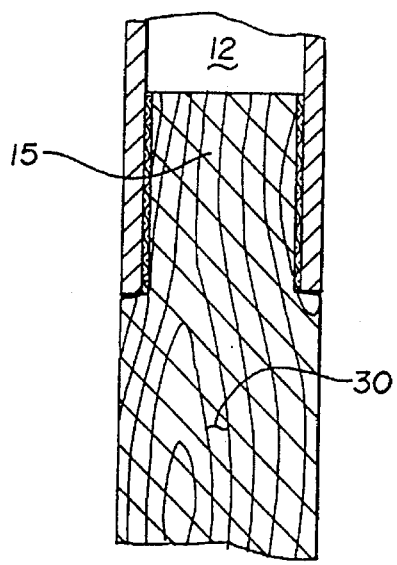
FIG. 7 is a view, partially in section, as viewed along section line 7—7 of FIG. 6.

It is preferred that the reinforcement material 21 covers the entire length of the replacement blade 30. However, the reinforcing effect is obtained even if the reinforcement material 21 covers only the connection end 15. Therefore, as shown in the embodiment of FIGS. 6 and 7, the reinforcement material 21 may, if desired, cover only the connection end 15. Alternatively, the reinforcement material may cover the connection end 15, the shoulder 16, and only part of the shaft 14. Similarly, embodiments where only a portion of the connection end 15 is covered by the reinforcing material are also within the scope of the present invention as long as the connection end 15 is sufficiently covered to provide reinforcement when inserted into the hollow lower end 13 of the handle 12.

During the manufacture of the hockey stick of the preferred embodiment, a braided tubular sleeve 31 is formed from fibrous material by a known, conventional textile manufacturing procedure which produces such braided textile articles. The braided tubular textile sleeve 31 is constructed so that it is stretchable along its tubular axis 34 and laterally in a direction normal to its tubular axis 33. As the braided sleeve is stretched along its tubular axis 34, its diameter 35 is reduced. Conversely, as the tube is stretched in a lateral direction 33, its length 36 decreases.

Figure 8:
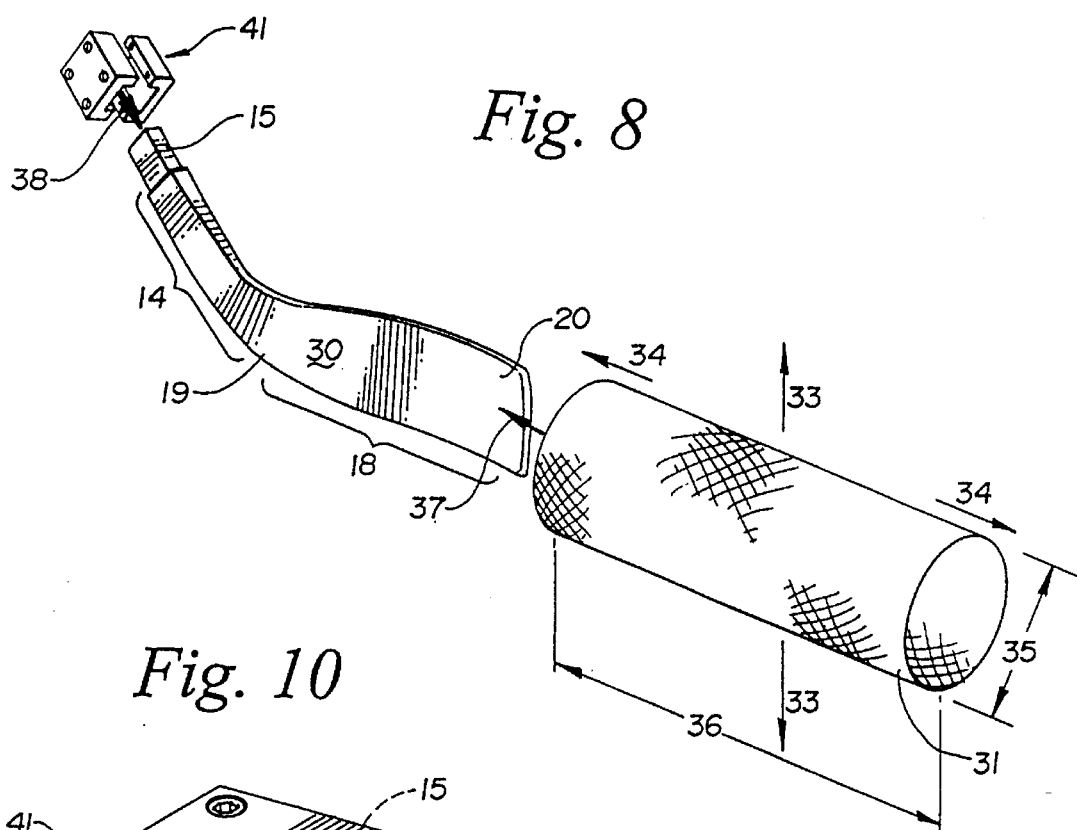
FIG. 8 is a perspective view of a hockey stick in the process of being reinforced with a braided tubular sleeve.

Production of the replacement blade of the present invention includes forming the connection end 15 by routing, shaving, shaping or otherwise cutting the end of the blade 30 so that the dimensions of the connection end 15 are smaller than the inner dimensions of the hollow lower end 13. Specifically, the end 15 should be cut to a dimension which, when the reinforcement material is applied and molded as provided below, will approximate the dimensions of the hollow lower end of the handle. A tubular sleeve 31 is then placed onto the blade 30 as shown in FIG. 8. The sleeve 31 can be slipped over the blade 30 from either the toe end 37 or from the other end 38. Axial tension is then applied to the sleeve 31 so as to stretch it in the axial direction 34. This results in a reduction of the sleeve diameter 35 and causes the sleeve 31 to fit tightly around the blade 30.

Resin is then applied to the braided tubular sleeve 31 and the sleeve is then further stretched axially, if desired, so as to cause it to conform closely to the contours of the blade 30. The order in which the resin and the braided tubular sleeve 31 are brought together or mixed is not of great importance. The braided tubular sleeve 31 may be treated with resin before it is axially stretched to conform to the contours of the blade 30, or even before it is placed on the blade 30. Alternatively, the stretching may be done first and the stretched braided tubular sleeve 31 may thereafter be treated with the curable resin material. Another possible procedure is to apply the resin to the blade 30 before placing the braided tubular sleeve 31 on the blade 30.

The manner in which the resin is applied may involve any appropriate method. Such methods presently include dipping the entire blade 30 and/or braided tubular sleeve 31 directly in a resin material. The resin material may also be applied to the braided tubular sleeve by hand or by brush or roller.

Figure 9:
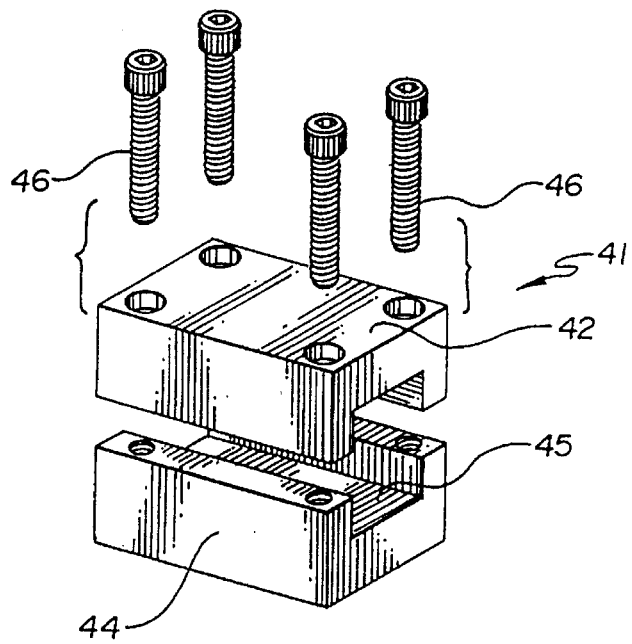
FIG. 9 is an exploded perspective view of a molding device.

Following application of the resin, and before curing, a molding device 41 as shown in FIG. 9 is used as an aid in molding the connection end 15 of the blade 30 to dimensions facilitating its insertion into the stick handle. The device 41 of the preferred embodiment includes a pair of mating mold halves 42 and 44, each having inner molding surface 45 which together define a mold surface with a configuration and dimensions approximating the configuration and dimensions of the hollow lower end 13 of the handle. The molding device 41 also includes a plurality of threaded members 46 for providing the device with a clamping force. Various other clamp mechanisms known in the art and various other mold structures may be used provided the molding surface approximates the configuration and dimensions of the hollow end 13 of the stick handle 12.

Clamping the connection end 15 with the molding device 41 forms the connection end 15 into the desired configuration and dimensions for insertion into the hollow lower end 13 of the handle 12. The device 41 also facilitates formation of the shoulder 16 and ensures that there is no gap between the braided tubular sleeve 31 and connection end 15. Without the molding device 41, axial stretching of the sleeve may cause a gap to form between the braided tubular sleeve 31 and the portion of the connection end 15 near the shoulder 16.

Figure 10:
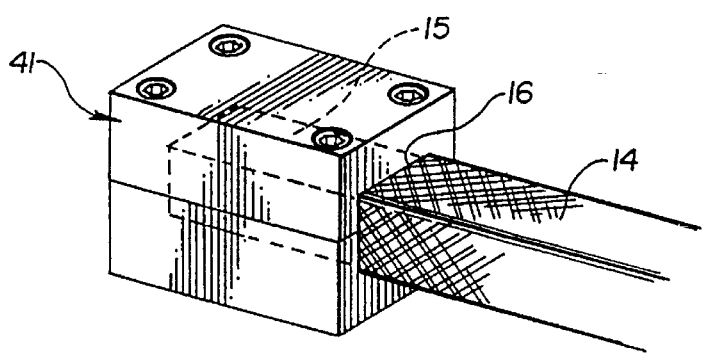
FIG. 10 is an enlarged, fragmentary perspective view of a molding device clamped on the connection end of a replacement blade to form the connection end and the shoulder.

Once the molding device 41 is clamped into molding position at the connection end 15, as shown in FIG. 10, the resinous material with which the braided tubular sleeve 31 has been treated is cured either by drying, heating, or by any other method suitable to the resinous material employed. After the resin is sufficiently cured, the molding device 41 is removed. A grinding or sanding operation is then performed to remove excess material at the toe 20 and at the area directly above the connection end 15.

The preferred embodiment of the invention has been described in the context of a braided tubular sleeve 31 used with a curable resin material. Other reinforcing materials can, however, be used. For example, fiberglass or other reinforcing material strips or sheets may be used to wrap around the connection end or other parts of the blade prior to molding. Similarly, the reinforcing material can be made from various other fibers or fiber combinations including, without limitation, filaments of carbon, quartz, and ceramic. Whatever the reinforcing material, the molding device 41 can be used to ensure that the connection end 15 is precisely the proper size and shape to fit into the hollow lower end 13 of the handle 12.

Figure 11:
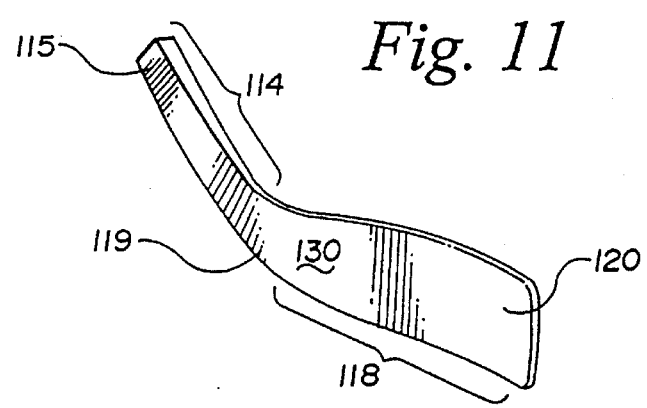
FIG. 11 is a perspective view of a blade representing an alternate embodiment of the present invention.

The present invention has been described in connection with a replacement blade 30 having a connection end 15 and a shoulder 16. Although this is the preferred embodiment, the present invention does not require a preformed or precut shoulder 16. The replacement blade 130 shown in FIG. 11 is an alternative embodiment of the present invention. The connection end 115, prior to application of the reinforcement material, has dimensions smaller than the interior dimensions of the lower end of the handle. The entire blade can then be covered with a reinforcement material, followed by molding the connection end 115 to exact dimensions. This molding step will form at least a limited shoulder even though no precut shoulder was provided.

Although the present invention has been shown and described with respect to preferred embodiments, various changes and modifications that are obvious to a person skilled in the art to which the invention pertains are deemed to lie within the spirit and scope of the invention as defined by the following claims.

We claim:

1. A hockey stick comprising:

a handle having a hollow lower end;

a replacement blade having a connection end insertable into said hollow lower end, a blade portion, and a shaft portion; and reinforcement material comprised of a plurality of reinforcement fibers covering at least a portion of said connection end, wherein said connection end with said reinforcement material thereon is insertable into said hollow lower end of said handle and said reinforcement material is disposed between said connection end and said hollow lower end when said connection end is so inserted.

2. The hockey stick of claim 1:

wherein said replacement blade further includes a shoulder between said connection end and said shaft portion;

wherein said shoulder abuts said hollow lower end when said connection end is inserted into said hollow lower end;

wherein said hollow lower end has inner dimensions; and wherein said connection end has outer dimensions approximating said inner dimensions.

3. The hockey stick of claim 2 wherein said reinforcement material also covers at least a portion of said shoulder.

4. The hockey stick of claim 2 wherein said reinforcement material also covers said shoulder, said shaft portion, and said blade portion.

5. A hockey stick comprising:

a handle having a hollow lower end;

a replacement blade having a connection end insertable into said hollow lower end, a blade portion, and a shaft portion; and reinforcement material comprised of a braided tubular sleeve covering at least a portion of said connection end, wherein said connection end with said reinforcement material thereon is insertable into said hollow lower end of said handle and said reinforcement material is disposed between said connection end and said hollow lower end when said connection end is so inserted.

6. The hockey stick of claim 5 wherein said reinforcement material further comprises a curable resin.

7. A replacement blade adapted for insertion into a hollow lower end of a hockey stick handle, said replacement blade comprising:

a blade portion;

a shaft portion;

a connection end adapted for insertion into a hollow lower end; and reinforcement material comprised of a plurality of reinforcement fibers covering at least a portion of said connection end, wherein said connection end with said reinforcement material thereon is insertable into said hollow lower end and said reinforcement material is disposed between said connection end and said hollow lower end when said connection end is so inserted.

8. The replacement blade of claim 7, wherein said reinforcement material also covers said shaft portion and said blade portion.

9. The replacement blade of claim 7, wherein said replacement blade further comprises a shoulder, adjacent to said connection end.

10. The replacement blade of claim 9, wherein said reinforcement material also covers at least a portion of said shoulder.

11. The replacement blade of claim 9 wherein said reinforcement material also covers said shoulder, said shaft portion, and said blade portion.

12. The replacement blade of claim 7 wherein said connection end with said reinforcement material covering has outer dimensions approximating said inner dimensions.

13. A replacement blade adapted for insertion into a hollow lower end of a hockey stick handle, said replacement blade comprising:

a blade portion;

a shaft portion;

a connection end adapted for insertion into said hollow lower end; and reinforcement material comprised of a braided tubular sleeve covering at least a portion of said connection end, wherein said connection end with said reinforcement material thereon is insertable into said hollow lower end and said reinforcement material is disposed between said connection end and said hollow lower end when said connection end is so inserted.

14. The replacement blade of claim 13, wherein said reinforcement material further comprises a curable resin.

15. A method of reinforcing a replacement blade for insertion into a hollow lower end of a handle, said hollow lower end having inner dimensions, and wherein said replacement blade includes a connection end having an exterior surface and being insertable into said hollow lower end, said method comprising the steps of:

applying a reinforcement material to the exterior surface of said connection end, wherein said reinforcement material includes a tubular braided sleeve and a curable resin;

forming said reinforcement material at said connection end into a configuration with exterior dimensions approximating said inner dimensions of said hollow lower end whereby said reinforcement material is disposed between said connection end and said hollow lower end when said connection end is inserted into said hollow lower end; and curing said curable resin.

16. The method of claim 15 further comprising the step of:

shaping said connection end into a configuration with dimensions smaller than said inner dimensions, wherein said shaping step is done prior to application of said reinforcement material.

17. The method of claim 15, wherein said forming step includes molding said reinforcement material at said connection end.

18. The method of claim 15 wherein said replacement blade includes a blade portion and a shaft portion and wherein the method further includes applying a reinforcement material to said blade and shaft portions.

* * * * *